United States Patent [19]

Duska et al.

[11] 4,058,298
[45] Nov. 15, 1977

[54] SCREW EXTRUDER WITH AN ENLARGED FEED SECTION

[75] Inventors: Joseph J. Duska, Manasquan; Paul E. McGill, Neshanic, both of N.J.

[73] Assignee: Midland-Ross Corporation, Cleveland, Ohio

[21] Appl. No.: 757,045

[22] Filed: Jan. 5, 1977

[51] Int. Cl.² .............................................. B29B 1/06
[52] U.S. Cl. ........................................ 366/76; 366/79
[58] Field of Search .............. 259/191, 192, 193, 105, 259/5, 6, 21, 41, 40, 64; 425/207, 208, 209

[56] References Cited

U.S. PATENT DOCUMENTS

| | | | |
|---|---|---|---|
| 3,689,182 | 9/1972 | Kovacs | 259/191 |
| 3,888,997 | 6/1975 | Gulbert | 259/191 |
| 3,924,842 | 12/1975 | Klein | 259/192 |
| 3,999,921 | 12/1976 | Thor | 259/191 |

Primary Examiner—Robert W. Jenkins
Attorney, Agent, or Firm—Woodrow W. Portz

[57] ABSTRACT

Disclosed is a screw extruder having an upstream feed section in which the bore and screw is of substantially larger diameter than that in a downstream melting section. The two screws are structurally separable and may be operably independent of each other. The extruder is constructed for removal of the smaller screw outwardly through the downstream end of the extruder. Various arrangements for driving the two screws are disclosed herein.

10 Claims, 5 Drawing Figures

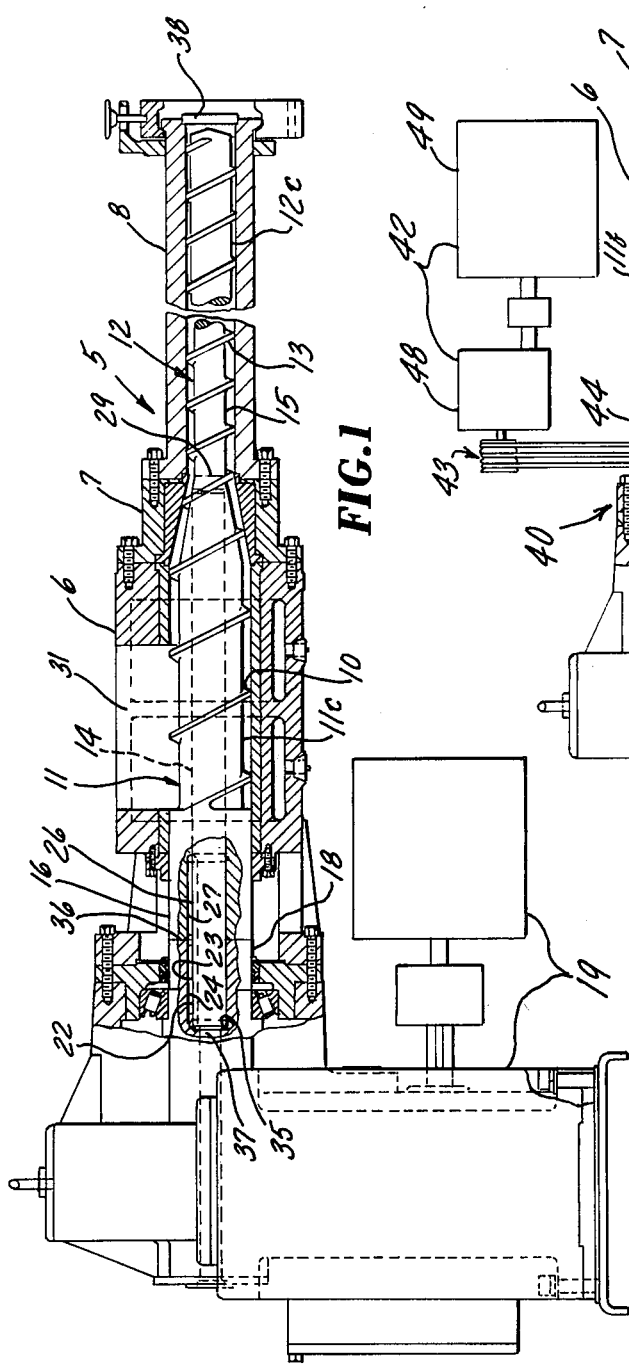
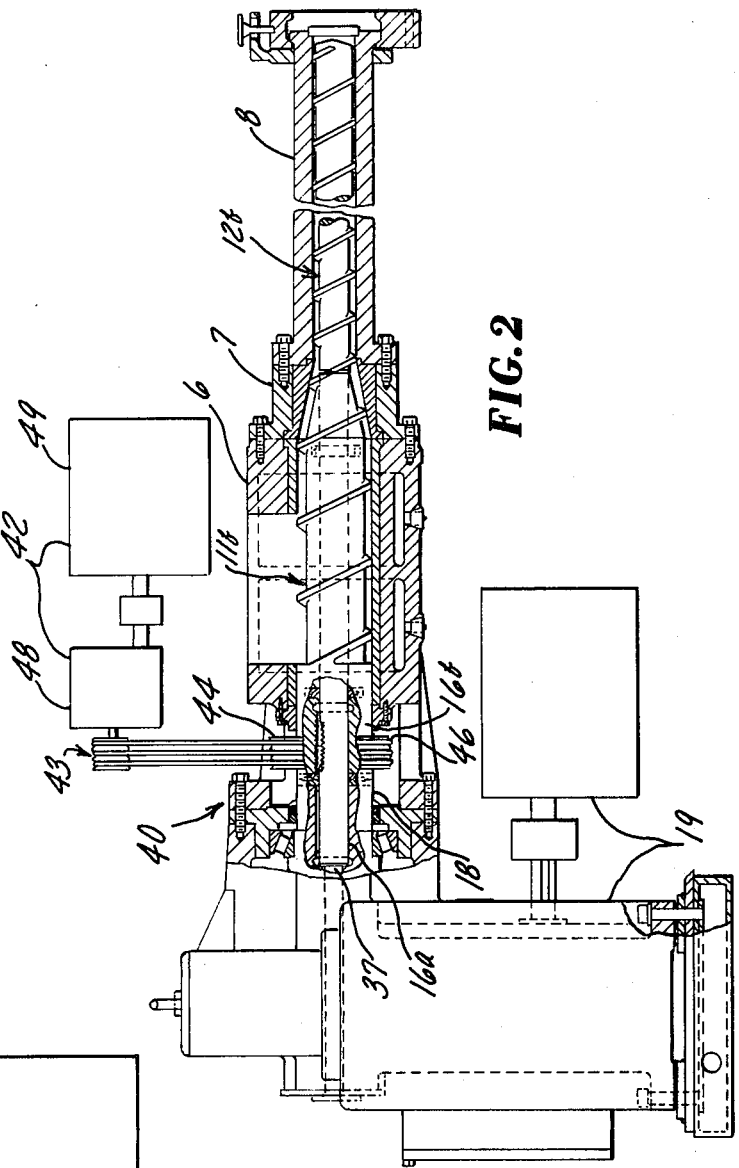

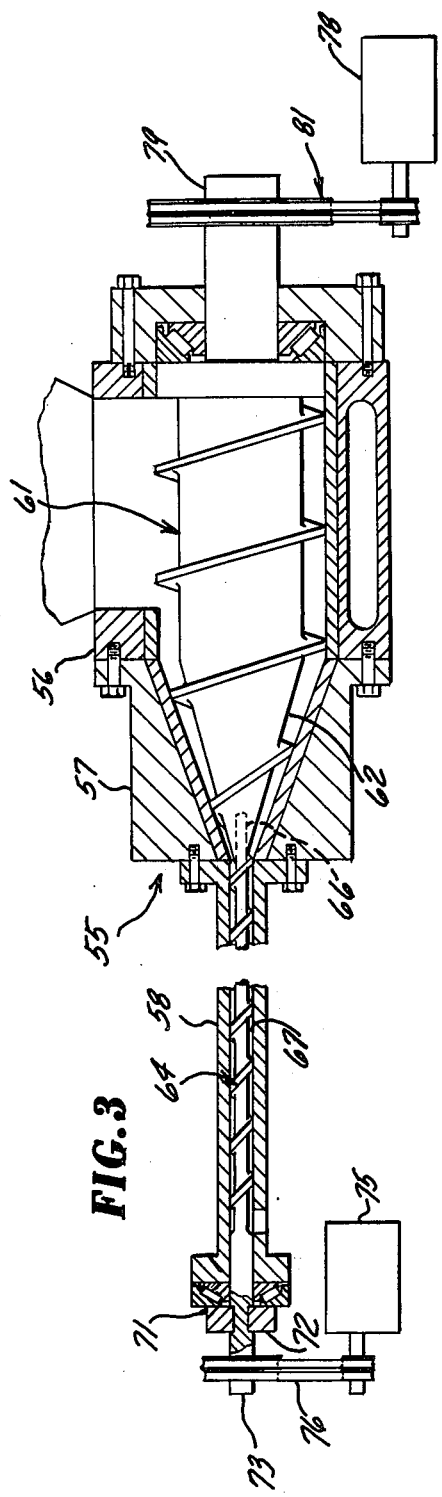
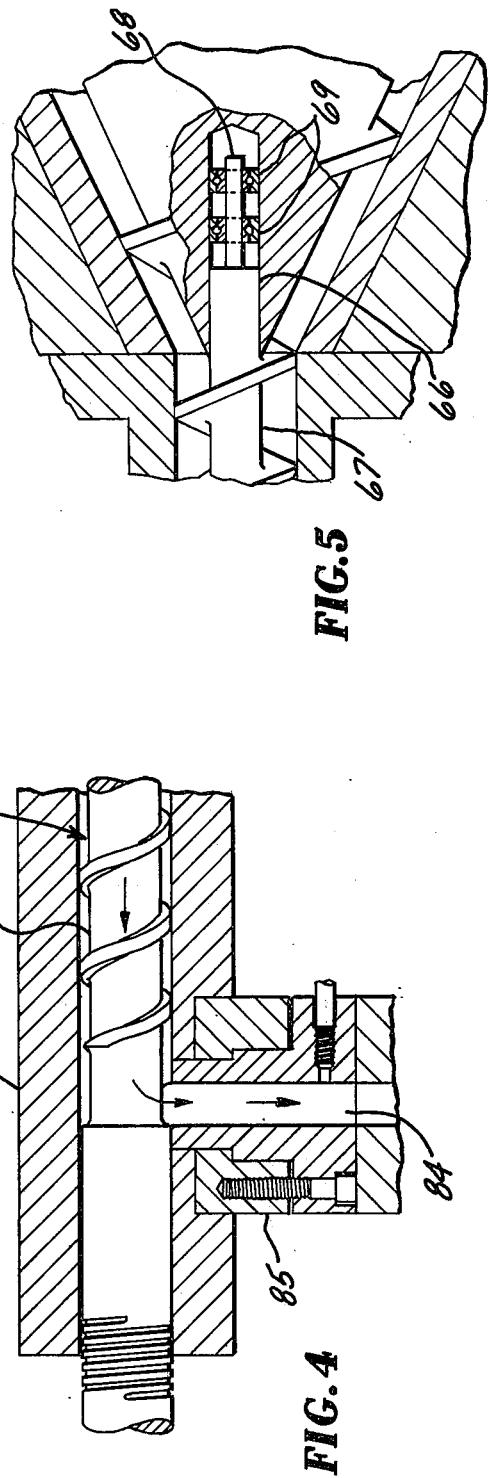

SCREW EXTRUDER WITH AN ENLARGED FEED SECTION

BACKGROUND OF THE INVENTION

The present invention relates to extruders of a type capable of receiving scrap plastic at ambient temperatures and discharging it as a melted extrudate. The scrap supplied to such machines may be of a very high bulk type, such as, comminuted polyethylene or polyvinyl chloride film. There is a great advantage, particularly when subjecting heat-sensitive high-bulk materials to a melting process, to reduce the bulkiness to the fullest extent possible before the application of heat. In this manner, the heat transfer may be maximized without the hazard of overheating and the extruder may be efficiently utilized by achieving a satisfactory throughput rate. In any event, the bulkiness must somehow be reduced in compression ratios that may range up to 25 to 1 to achieve practical through-put of the work material.

Among the prior art devices for reducing bulkiness are the motorized hopper screw feeders which fail to achieve feed stock compression ratios greater than about 4 to 1 and, moreover, are quite expensive.

Another expedient of the prior art is to provide a large feed opening, e.g., the so-called, "wedge key" feed throats, wherein the capability of the extruder screw to pull in a large volume of work material is obtained primarily through a reduction of the diameter of the screw core in that section of the screw within the feed throat. The feed throat is defined as that section of the barrel providing a lateral feed port plus about one turn of the screw and the surrounding barrel section downstream of the feed port. The capability of the "wedge key" feed throat, however, is limited by the strength of the screw in the feed section and the inability to obtain high compression ratios.

It is known also to construct extruders wherein the screw and the barrel have a large diameter within the feed section than in the melt section. An important disadvantage with this machine is that the cleaning of the extruder screw requires dismantling or removal thereby causing the cleanup operation to be quite time consuming.

SUMMARY OF THE INVENTION

The invention is embodied in an extruder comprising a barrel having an upstream feed section of larger screw bore, in a downstream section of smaller screw bore in coaxial alignment with the larger bore, and a relatively short tapered transition section joining the larger and smaller bore sections; and a screw assembly comprising essentially a larger diameter screw occupying the larger upstream barrel section and a smaller diameter screw occupying the smaller diameter downstream barrel section. In a preferred embodiment, the larger screw is provided with an axial bore through its core portion to accommodate an upstream-extending shaft portion of the smaller screw enabling the two screws to mutually support each other in coaxial relationship.

The two screws may be keyed or otherwise locked against relative rotation and driven by a single power source, such as a motor and transmission combination mechanically connected with an upstream end portion of either screw projecting beyond the upstream end of the barrel. For convenience of cleaning, the smaller screw is removable from the extruder outwardly of its extrudate-discharging end and may be forced from the larger screw by pushing on the above-mentioned shaft portion of smaller screw through the axial opening of the larger screw.

The separability of the screws makes it possible to drive both screws together, separately, from one end of the extruder, or from opposite ends.

BRIEF DESCRIPTION OF THE DRAWING

FIG. 1 is a fragmentary shortened side view partly in section of an extruder of the type having driving means for both the larger and the smaller screw in upstream relation with the screws.

FIG. 2 is a fragmentary shortened side view partly in section of a modified extruder of the type having separate driving means for the larger screw and the smaller screw in upstream relation with both screws.

FIG. 3 is a fragmentary shortened schematic view with parts in section along the axis of rotation of a modified extruder having separate driving means for the smaller screw in downstream relation therewith and other driving means for the larger screw in upstream relation therewith.

FIG. 4 is a fragmentary enlarged view in section of an outlet portion of the extruder of FIG. 3.

FIG. 5 is a fragmentary enlarged view of a transition portion of the extruder of FIG. 3.

DESCRIPTION OF PREFERRED EMBODIMENTS

FIG. 1 illustrates an extruder 5 of which the barrel comprises an upstream feed section 6, a short transition section 7, and a downstream section 8. The extruder further comprises a larger screw 11 having a thread 10 received in barrel sections 6 and 7 at close radial clearance therewith and a smaller screw 12 having a thread 13 received in section 8 at close radial clearance therewith. The screw 12 has an elongate shaft portion or extension 14 extending upstream contiguously from its threaded downstream section 15 through the central bore of the larger screw 11 including its cylindrical upstream extension 16. The small screw extension 14 extends also upstream into a socket of a rotary driving member forceably rotated by the motor and power transmission assembly 19. Drive from the assembly is transmitted to the screws through a key 22 positioned in radially opposing keyways 23 and 24 of the extension shaft 14 and the socket member 18, respectively. The smaller screw 12, being thusly driven, transmits torsion to the large screw 11 by way of a key 26 occupying a portion of the keyway 23 and a keyway 27 of the cylindrical extension 16 of the large screw. The threaded section of the large screw terminates at its downstream end 29 along the outer surface of the extension shaft 14 of the small screw at the junction of the barrel sections 7 and 8. The feed barrel section 6 has a feed opening 31 elongated in the axial direction of the extruder through approximately two thread turns. The feed section 6 extends downstream beyond the opening 31 approximately one turn of the thread to the junction of barrel sections 6 and 7.

Since the core 11c of the larger screw must internally accommodate the shaft extension 14 of screw 12, the outer diameter of core 11c is substantially greater than that of the core 12c of the smaller screw in order to provide sufficient torsion strength in core 11c. For sufficient torsion strength in the small screw the shaft extension thereof to a driving means is preferably as large in diameter as the core of the threaded portion thereof.

When the two screws are driven at the same relative speeds as required in this first described embodiment, the relative depth and pitch of the threads on the screws is determined by the compression ratio selected, i.e., the volume transferred by the larger screw in relation to that transferred by the smaller screw. Compression ratios of 3 to 25 are contemplated in the practice of this invention.

End thrust of the two screws 11 and 12 is absorbed by the socket member 18 which is in turn supported internally by the assembly 19 by end thrust bearing means not shown. As shown, the shaft extension 14 abuts the member 18 at the bottom of the socket at surface 35. The cylindrical extension 16 of the large screw engages a downstream end surface 36 of the socket member in axially spaced relation with surface 35 when subjected to upstream-directed end thrust force. The member 18 is provided with an axial bore 37 which is exposed from the left side of the machine for receiving a punch or other tool for forcing the small screw along with its extension 14 endwise through the extruder and outward of its downstream opening 38.

FIG. 2 illustrates a modified extruder 40 which is similar, or even identical, to extruder 5 in many of its mechanical features except that provision is made for driving the two screws by separate torsion power sources. As shown, the smaller screw 12b is driven by means, such as the motor and transmission assembly 19, connected mechanically to another socket member 18 in the same manner as shown in FIG. 1. The larger screw 11b is not keyed to the shaft extension 16a but is turned independently of the smaller screw by a motor and transmission assembly 42 transmitting power to the screw, e.g., through an output shaft and sheave combination 43 connected by a plurality of vee belts to sheaves 44 fixed to the cylindrical extension 16b of the larger screw. As described with respect to extruder 5, the smaller screw 12b is extractible from the discharge end of the extruder and may be pushed out of the extruder toward the right by a tool inserted from the left end of the machine shown in FIG. 2 through the bore 37 of the socket member 18.

Transmission 48 and the motor 49 of the assembly 42 may be provided from known types including variable speed devices, or the sizes of the torsion transmitting sheaves 44,43 may be changed to obtain desired ratios of the rotative speeds of the screws 11b and 12b.

FIG. 3 schematically illustrates a modified extruder 55 of which its barrel comprises an upstream feed section 56, a transition section 57 and a downstream melt section 58. Sections 57,56 house a larger screw 61 having a tapered portion received in the transition barrel section 57, and a smaller screw 64 housed in the barrel section 58.

As found in the previous embodiments, the smaller screw 64 has a shaft portion 66 extending from its threaded portion 67 in the upstream direction coaxially internally of the larger screw and in bearing relation therewith to maintain both screws in approximate coaxial relationship. As shown in FIG. 5, the shaft portion 66 has an extension 68 received in a pair of ball bearings 69 adapted for radial loading. As shown, end thrust loading resulting from upstream pull on the smaller screw 64 is absorbed in means, such as a tapered roller bearing 71 mounted at the downstream end of the extruder housing, e.g., the end of barrel section 58. End thrust loading on the bearing is facilitated by a collar 72 mounted on an undercut portion of the shaft extension 73 of the smaller screw against the outer race of the bearing. The small screw is driven, e.g., by a motor 75 connected with the shaft extension by means such as a sprocket and chain drive 76. At the upstream end of the extruder the larger screw 61 is driven, e.g., by a motor 78, or motor-transmission combination, connected in drive relation with an upstream cylindrical extension 79 of the screw by a multiple pulley-vee belt system 81, or sprocket chain drive or other equivalent means. As shown in FIG. 4, the extruder 55 is adapted to discharge extrudate at the extremity of the threaded section 83 of the screw along a lateral path 84 defined by exhaust port structure 85.

Apparatus according to the embodiments of FIGS. 2 and 3 comprise separate driving means for each screw. As driving means for screw extruders are commonly of variable speed capability, compression ratios and extrudate delivery rates developed by two independently driven screws may be selected at will.

What is claimed is:

1. An extruder comprising:
   a barrel having an upstream feed section of larger screw bore, and a downstream section of smaller screw bore in coaxial alignment with the larger bore, and a relatively short tapered transition section providing a transition bore joining said larger and smaller bore sections;
   a screw assembly comprising a first large-diameter screw occupying said upstream section with the thread thereof to sweep said larger bore and said transition bore; and a second smaller diameter screw occupying said downstream section with the thread thereof to sweep said smaller bore, both of said screws having a threaded portion comprising a core and a thread supported thereon, and an axial extension adapting each screw for connection with a drive means;
   said second screw having a shaft portion extending coaxially upstream internally of said first screw in bearing relation therewith to connect and maintain said screws in coaxial relationship; and
   drive means connecting with said extensions for rotating both screws.

2. The extruder of claim 1 wherein:
   said first screw is axially open for access to said shaft portion.

3. The extruder of claim 2 wherein:
   said shaft portion is merged with said extension of the smaller screw.

4. The extruder of claim 1 wherein:
   said drive means is located in the upstream direction from said feed section;
   said shaft portion is merged with said extension of the second screw and extends through said larger screw into drive connection with said drive means; and
   the extruder comprises detent means for locking said larger screw to said extension.

5. The extruder of claim 4 wherein:
   said extension is extractible from said larger screw in a downstream direction; and
   said detent means and means for connecting said drive means and said shaft portion comprises a first keyway in said shaft portion extending into the drive means and the larger screw, keyways in said drive means and said larger screw in registry with said first keyway, and key means occupying said keyways.

6. The extruder of claim 5 wherein:

said drive means comprises an end-thrust-absorbing drive member defining separate coaxial axially-spaced abutment surfaces facing downstream for engaging corresponding upstream-facing end surfaces of said shaft portion and said large screw.

7. The extruder of claim 1 wherein:

said screws are rotatably independent; and said drive means comprises first and second power means for separately driving said first and second screws, respectively.

8. The extruder of claim 7 wherein:

said extension of said first screw is cylindrical and projects upstream from said barrel feed section;

housing means fixed to said barrel extending in said upstream direction from said upstream section in support of said cylindrical extension, said first-screw extension being connected in drive relation with said first power means;

said second-screw extension extending upstream through and beyond said cylindrical extension into driving connection with said second power means and in freely rotatable relation with said first screw.

9. The extruder of claim 8 wherein:

the extension of the first screw extends upstream from its said threaded portion into connection with said first power means, and said extension of the second screw extends downstream from its said threaded portion and outwardly of said downstream barrel section into connection with said second power means.

10. The extruder of claim 9 comprising thrust-bearing means supported on said barrel surrounding said screw extension for absorbing end thrust force exerted by said first screw in said upstream direction.

* * * * *